(12) United States Patent
Chamuczynski et al.

(10) Patent No.: US 10,286,782 B2
(45) Date of Patent: May 14, 2019

(54) PASSIVE REDUCTION OR ELIMINATION OF FROST AND FOG

(71) Applicant: FLEXTRONICS GLOBAL SERVICES CANADA INC. SERVICES GLOBAUX FLEXTRONICS CANADA INC., Toronto (CA)

(72) Inventors: Przemyslaw Chamuczynski, Toronto (CA); Gary Warren, Aurora (CA)

(73) Assignee: FLEXTRONICS GLOBAL SERVICES CANADA INC. SERVICES GLOBAUX FLEXTRONICS CANADA INC., Toronto (CA)

( * ) Notice: Subject to any disclaimer, the term of this patent is extended or adjusted under 35 U.S.C. 154(b) by 144 days.

(21) Appl. No.: 14/275,541

(22) Filed: May 12, 2014

(65) Prior Publication Data
US 2015/0321556 A1    Nov. 12, 2015

(51) Int. Cl.
*B60K 35/00*    (2006.01)
*B60K 37/02*    (2006.01)
(Continued)

(52) U.S. Cl.
CPC .............. *B60K 35/00* (2013.01); *B60K 37/02* (2013.01); *G01D 11/26* (2013.01); *G02B 27/0006* (2013.01); *B60K 2350/2073* (2013.01); *B60K 2350/2086* (2013.01); *Y10T 29/4989* (2015.01); *Y10T 29/49828* (2015.01)

(58) Field of Classification Search
CPC ........ G02B 23/16; G02B 7/1815; G02B 7/28; G02B 27/0006; G02B 1/105; G02B 5/3033; B60K 35/00; B60K 2350/2073; B60K 37/02; B60K 2350/2086; G02F 1/1523; G02F 1/1533; F24F 7/00; F24F 7/04; C03C 17/10; C03C 17/36; G01D 11/26; Y10T 29/49828; Y10T 29/4989
USPC .................. 359/511–513, 275; 454/237, 241; 427/165, 162, 163.1
See application file for complete search history.

(56) References Cited

U.S. PATENT DOCUMENTS 4,292,681 A   9/1981   Kloss et al.
6,071,000 A   6/2000   Rapp
(Continued)

FOREIGN PATENT DOCUMENTS

CA      2274075 C       11/2003
DE    102005022938    * 12/2006   ............... B60Q 1/00
(Continued)

OTHER PUBLICATIONS

English translation of DE 102005022938, machine translated on Feb. 14, 2018.*
(Continued)

*Primary Examiner* — Jie Lei
(74) *Attorney, Agent, or Firm* — Volpe and Koenig, P.C.

(57) ABSTRACT

Lens fogging or frosting on inside surfaces of an instrument lens may be reduced or prevented by sealing the instrument housing. Damage or rupture of the sealed housing due to an increase or decrease in pressure within the housing may be avoided while reducing introduction of moisture into the housing by venting the housing through a tube to a location having a relatively lower humidity.

17 Claims, 8 Drawing Sheets

(51) Int. Cl.
*G01D 11/26* (2006.01)
*G02B 27/00* (2006.01)

(56) References Cited

U.S. PATENT DOCUMENTS

| | | | | |
|---|---|---|---|---|
| 6,116,765 | A * | 9/2000 | Lin | F21S 48/335 362/294 |
| 6,506,446 | B2 * | 1/2003 | Yamamoto | C09K 3/18 106/13 |
| 2006/0199507 | A1 * | 9/2006 | Du Plessis | B01D 46/0023 454/237 |
| 2012/0229701 | A1 | 9/2012 | Pavithran et al. | |

FOREIGN PATENT DOCUMENTS

| | | |
|---|---|---|
| EP | 1583598 B1 | 10/2005 |
| GB | 1042115 A | 9/1966 |
| JP | 02-279489 A | 11/1990 |
| JP | 08-219817 A | 8/1996 |
| JP | 11-116884 A | 4/1999 |
| JP | 2000208948 A | 7/2000 |
| JP | 2006-184154 A | 7/2006 |
| JP | 2012-037375 A | 2/2012 |

OTHER PUBLICATIONS

EPO English translation of DE 102005022938, machine translated on Jun. 26, 2018.*

* cited by examiner

PASSIVE REDUCTION OR ELIMINATION OF FROST AND FOG

FIELD OF INVENTION

The invention relates to reducing frost or fogging on a lens or other surface.

BACKGROUND

Condensation may occur on a surface of an object when its temperature drops below the dew point for the surrounding air. This effect may be observed in the formation of dew on grass, condensation of water droplets on a drinking glass, or fogging of a window or lens. In freezing conditions, condensation may accumulate on a surface of an object in the form of frost.

Such fogging or frosting may be undesirable on lens or other surface through which it is desirable to see or otherwise transmit light, for example, on the lens of a vehicle instrument gauge.

SUMMARY

Lens fogging or frosting on inside surfaces of an instrument lens may be reduced or prevented by sealing the instrument housing. Damage or rupture of the sealed housing due to an increase or decrease in pressure within the housing may be avoided while reducing introduction of moisture into the housing by venting the housing through a tube to a location having a relatively lower humidity.

BRIEF DESCRIPTION OF THE DRAWINGS

A more detailed understanding may be had from the following description, given by way of example in conjunction with the accompanying drawings wherein.

DETAILED DESCRIPTION

One example of a surface upon which unwanted condensation may occur is a lens covering an instrument, instrument panel, or instrument cluster of a vehicle. It is noted that the term lens as used herein includes both refracting and non-refracting light transmitting elements, such as view windows, and translucent as well as transparent elements. Fogging of the lens may occur either on the inside or outside surface of the lens depending on environmental conditions. While it may be possible to clear fogging from the outside surface of the lens, fogging on the inside surface may be more difficult to remove depending on the configuration of the cluster.

Fogging on the inside surface of the lens may occur for example when humidity is present in or enters the instrument cluster. In this case, if the temperature of the lens drops below the dew point, condensation of the moisture in the air on the inside surface of the lens may occur.

One approach for reducing fogging may be to apply an anti-fog treatment such as a coating or surface to one or more surfaces of the lens. Anti-fog treatments may include surfactants or hydrophilic surfaces or substances for example. In this case, moisture condensing on the lens may be spread out or absorbed by the anti-fog treatment such that the condensation is less visible, which may result in less obstruction of visibility or light transmission through the lens.

However if the temperature of the lens drops below the frost point or freezing temperature of the moisture, some of the condensation otherwise absorbed or spread by the anti-fog treatment may freeze and create frost that obstructs visibility through the lens. Fogging in such freezing conditions may be referred to as frosting or icing.

Another approach for reducing lens fogging which may reduce the formation of frost on an inside surface of the lens may be to hermetically seal the instrument cluster. If an instrument cluster is constructed as a hermetically sealed unit where the interior has low moisture content, both fogging and icing may be reduced because of the lack of available moisture for condensation.

However hermetically sealing an instrument cluster may allow pressure to build within the instrument cluster with respect to the exterior atmospheric pressure. The cluster may also be subjected to cyclical pressure changes due to cyclical temperature and/or weather changes, such as night and day temperature transitions or engine or cabin temperature or pressure changes. These cyclical changes may arise where the cluster is mounted to a vehicle either inside the cabin of a vehicle or proximate to the engine, or where the vehicle experiences rapid changes in altitude for example. These pressures may increase stress and fatigue on the components of the cluster, decreasing operational life of the cluster components.

Figure 1:
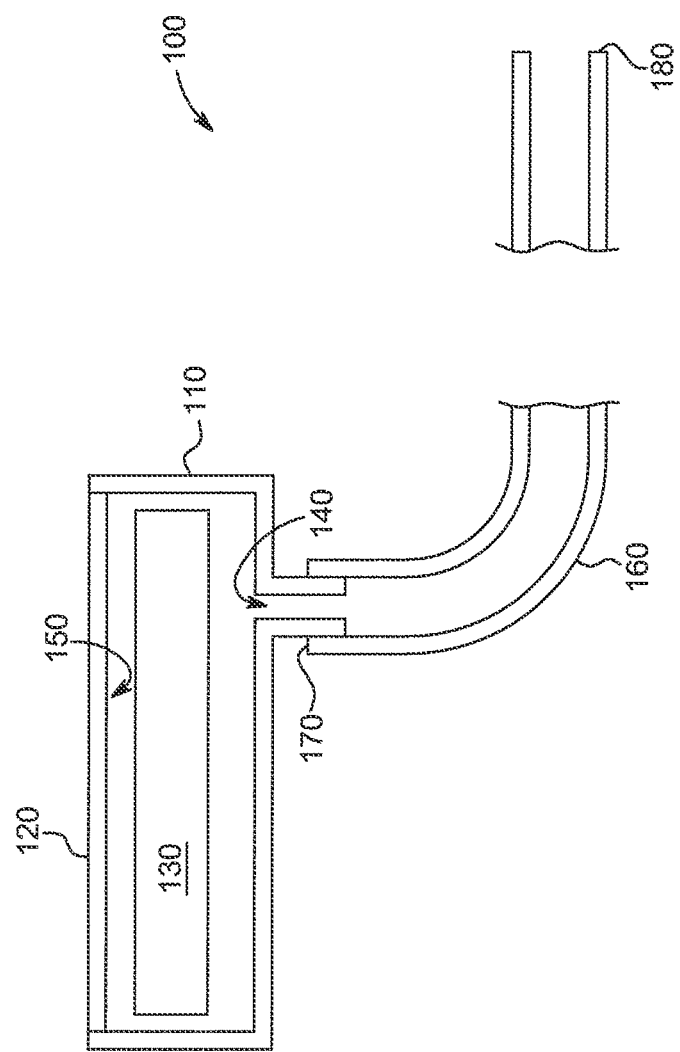
FIG. 1 is cross-sectional view of an example instrument cluster.

FIG. 1 illustrates an example instrument cluster 100 having a housing 110, lens 120, and internal components 130. Housing 110 includes a vent 140 which may permit a pressure difference between the inside and outside of housing 110 to equalize.

Housing 110 may be substantially air tight except for vent 140, which is connected to tube 160. Vent 140 may comprise or be attached to a fitting as shown to facilitate the connection to tube 160. The connection between vent 140 and tube 160 may also be substantially air tight. Tube 160 has a proximal end 170 and a distal end 180.

If pressure within housing 110 increases, the pressure increase may force air or other gasses present within housing 110 to exit through vent 140, thus equalizing the pressure or reducing the change in pressure. If pressure within housing 110 decreases, the pressure decrease may draw air or other gasses into housing 110 through vent 140, thus equalizing the pressure or reducing the change in pressure.

Distal end 180 may be installed in a location having a different humidity from the location of housing 110. Thus, air or other gasses drawn into housing 110 through vent 140 will have a humidity substantially similar to the location of distal end 180. If distal end 180 is located in a relatively low humidity environment, this may have the advantage of permitting housing 110 to be located in a more humid environment while avoiding drawing the humidity local to housing 110 into housing 110.

An anti-fog treatment 150 may be applied to the inside surface of lens 120. It is noted that anti-fog treatment 150 may be omitted in some implementations. As discussed herein, the anti-fog treatment may include surfactants or hydrophilic surfaces or substances for example. Moisture condensing on the inside surface of lens 120 may be spread out or absorbed by the anti-fog treatment 150 such that it is less visible and does not obscure visibility through the lens. However if the temperature of the lens 120 drops below the freezing temperature of the moisture, some of the condensation absorbed or spread by the anti-fog treatment 150 may freeze and create frost that obstructs visibility through the lens.

The formation of frost on the inside surface of lens 120 may be reduced however by maintaining a low moisture environment within housing 110, such as by locating distal end 180 as discussed above. This arrangement may also improve the service life of internal components 130 by reducing their exposure to moisture and pressure changes.

Figure 2:
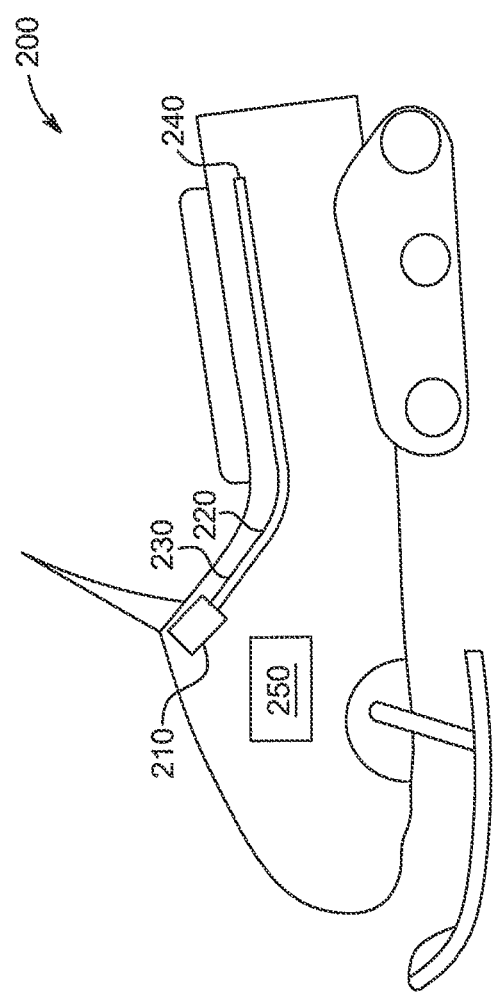
FIG. 2 is a cross-sectional view of an example vehicle having an instrument cluster similar to the instrument cluster shown in FIG. 1.

FIG. 2 illustrates an example vehicle 200 which includes an instrument cluster, similar to cluster 100 described with respect to FIG. 1, having a housing 210, a lens (not shown), and a tube 220. Tube 220 has a proximal end 230 and a distal end 240.

Vehicle 200 also includes a motor 250. When motor 250 is running, its temperature may rise, heating the housing 210. Sun shining on housing 210 or other conditions may likewise cause its temperature to rise. As the temperature of the air within housing 210 rises, pressure within housing 210 may increase. The rising pressure within housing 210 may be relieved as air evacuates housing 210 through tube 220.

If motor 250 is subsequently shut down, its temperature may drop, allowing the housing 210 to cool. Nightfall or other conditions may likewise cause the temperature of the housing 210 to drop. As the temperature of the air within housing 210 drops, pressure within housing 210 may decrease. This falling pressure (negative pressure or vacuum) may be relieved as air is drawn into housing 210 through tube 220 from the vicinity of distal end 240.

As shown in FIG. 2, distal end 240 is located toward the rear of vehicle 200, away from housing 210 and motor 250. This location of distal end 240 may be in the vicinity of air which is cooler or which for other reasons has a lower moisture content than air in the vicinity of housing 210 and motor 250.

For example, as discussed above the temperature of air in the vicinity of housing 210 may rise, as well as the temperature of housing 210 itself, during operation of motor 250. Sunlight falling on housing 210 and its vicinity may also cause these temperatures to rise. Because warmer air is capable of absorbing a greater amount of moisture than relatively cooler air, the humidity of the air in the vicinity of housing 210 may increase, such as through absorption of evaporating liquids for example. After motor 250 is shut down and begins to cool, or after sun is no longer falling on housing 210 for example, pressure inside housing 210 may begin to decrease, drawing air through tube 220 from distal end 240. Humidity in the air in the vicinity of housing 210 may condense on local surfaces. However because distal end 240 is located in an area remote from the moist air in the vicinity of housing 210, the air drawn into housing 210 may have a relatively lower amount of moisture available to condense on inside surfaces of housing 210, thus reducing fogging on the inside surface of the lens (not shown).

It is noted that while vehicle 200 is depicted as a snowmobile, housing 210 and tube 220 may be installed in other types of vehicles such as aircraft, ships, motorcycles, and cars, for example, or in other non-vehicle applications, such as outdoor industrial equipment. It is also noted that while distal end 240 is shown disposed toward the rear of vehicle 200, distal end 240 may be placed in other locations as appropriate, such as other locations having a relatively lower humidity. Such location may permit installation of housing 210 in a more humid environment than would otherwise be desirable for reasons of lens fogging, frosting, or component moisture exposure.

Figure 3:
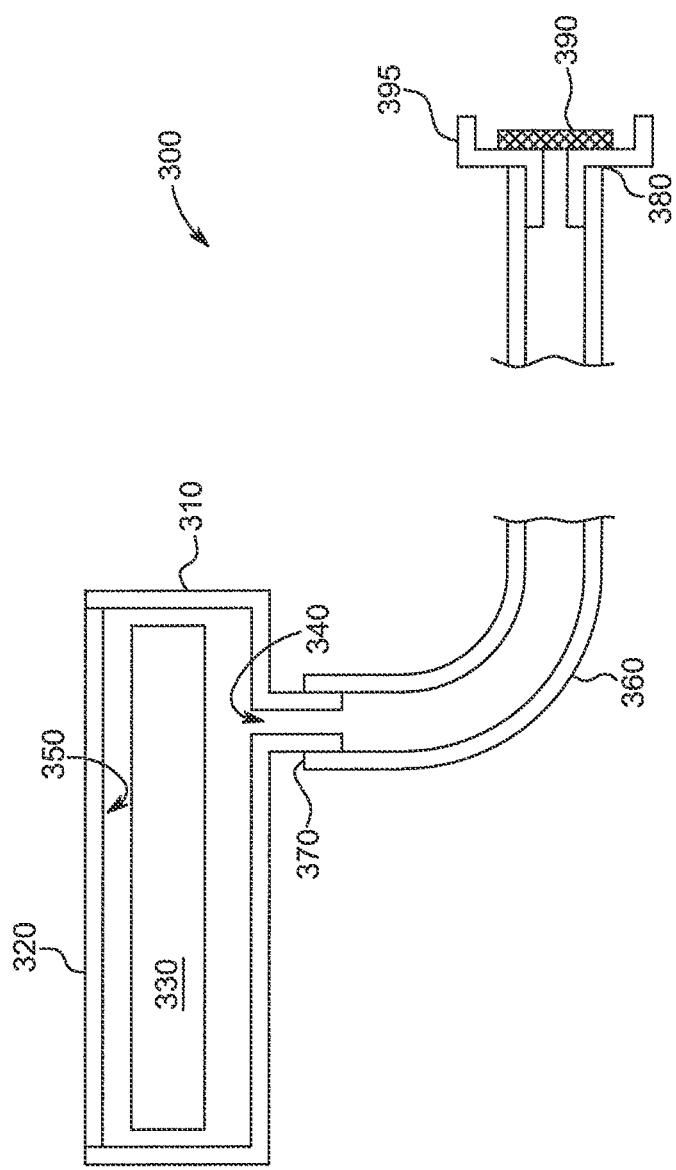
FIG. 3 is cross-sectional view of an example instrument cluster similar to the instrument cluster shown in FIG. 1 which includes a membrane.

FIG. 3 illustrates an example instrument cluster 300, similar to instrument cluster 100 as shown and described with respect to FIG. 1, which further includes a membrane 390.

Cluster 300 includes a housing 310, lens 320, and internal components 330. Housing 310 includes a vent 340 which may permit a pressure difference between the inside and outside of housing 310 to equalize. Vent 340 is connected to a tube 360.

Housing 310 may be substantially air tight, except for vent 340, which is connected to tube 360. Vent 340 may comprise or be attached to a fitting as shown to facilitate the connection to tube 360. The connection between vent 340 and tube 360 may also be substantially air tight. Tube 360 has a proximal end 370 and a distal end 380.

Membrane 390 is installed in distal end 380 in such a way that gasses can only enter distal end 380 through membrane 390. A fitting 395 or other suitable structures may be used to attach membrane 390 to distal end 380. Membrane 390 may be a micro-porous membrane or other suitable membrane which permits the passage of gasses while preventing or impeding the passage of liquids or solids.

It is noted that membrane 390 may also be installed on proximal end 370 or in another location within tube 360 in a suitable way (not shown) such that gasses can only transit tube 360 from distal end 380 to proximal end 370 through membrane 390. Membrane 390 may also be installed covering vent 340 in a suitable way (not shown) such that gasses may only enter housing 310 through membrane 390.

If pressure within housing 310 decreases, the pressure decrease may draw air or other gasses into housing 310 from distal end 380 through membrane 390, tube 360, and vent 340 into housing 310.

Distal end 380 may be installed in a location having a different humidity from the location of housing 310. Thus, air or other gasses drawn into housing 310 through vent 340 will have a humidity substantially similar to the location of distal end 380. If distal end 380 is located in a relatively low humidity environment, this may have the advantage of permitting housing 310 to be located in a more humid environment while avoiding drawing the humidity local to housing 310 into housing 310.

Further, by arranging membrane 390 such that liquids are prevented from entering housing 310, the humidity within housing 310 may be further controlled. Membrane 390 may also reduce the humidity of air or other gasses entering housing 310 through membrane 390.

An anti-fog treatment 350 may be applied to the inside surface of lens 320. It is noted that anti-fog treatment 350 may be omitted in some implementations. As discussed herein, the anti-fog treatment may include surfactants or hydrophilic surfaces or substances for example. Moisture condensing on the inside surface of lens 320 may be spread out or absorbed by the anti-fog treatment 350 such that it is less visible and does not obscure visibility through the lens. However if the temperature of the lens 320 drops below the freezing temperature of the moisture, some of the condensation absorbed or spread by the anti-fog treatment 350 may freeze and create frost that obstructs visibility through the lens.

The formation of frost on the inside surface of lens 320 may be reduced however by maintaining a low moisture environment within housing 310, such as by locating distal end 380 and installing membrane 390 as discussed above. This arrangement may also improve the service life of internal components 330 by reducing their exposure to moisture and pressure changes.

Figure 4:
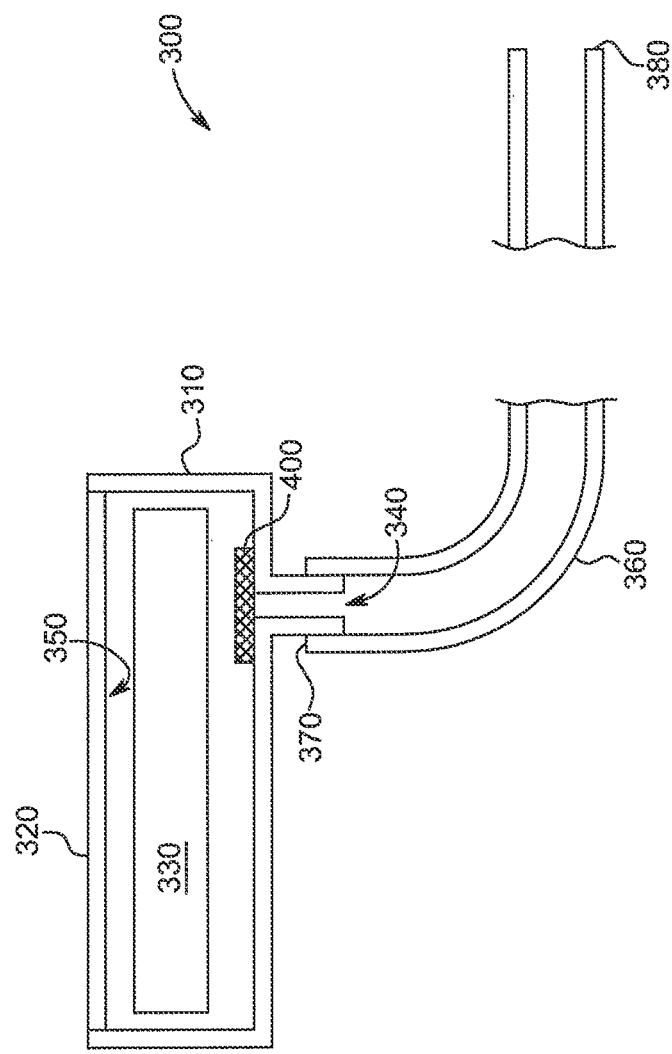
FIG. 4 is cross-sectional view of the example instrument cluster shown in FIG. 3, illustrating another possible position of the membrane.
Figure 5:
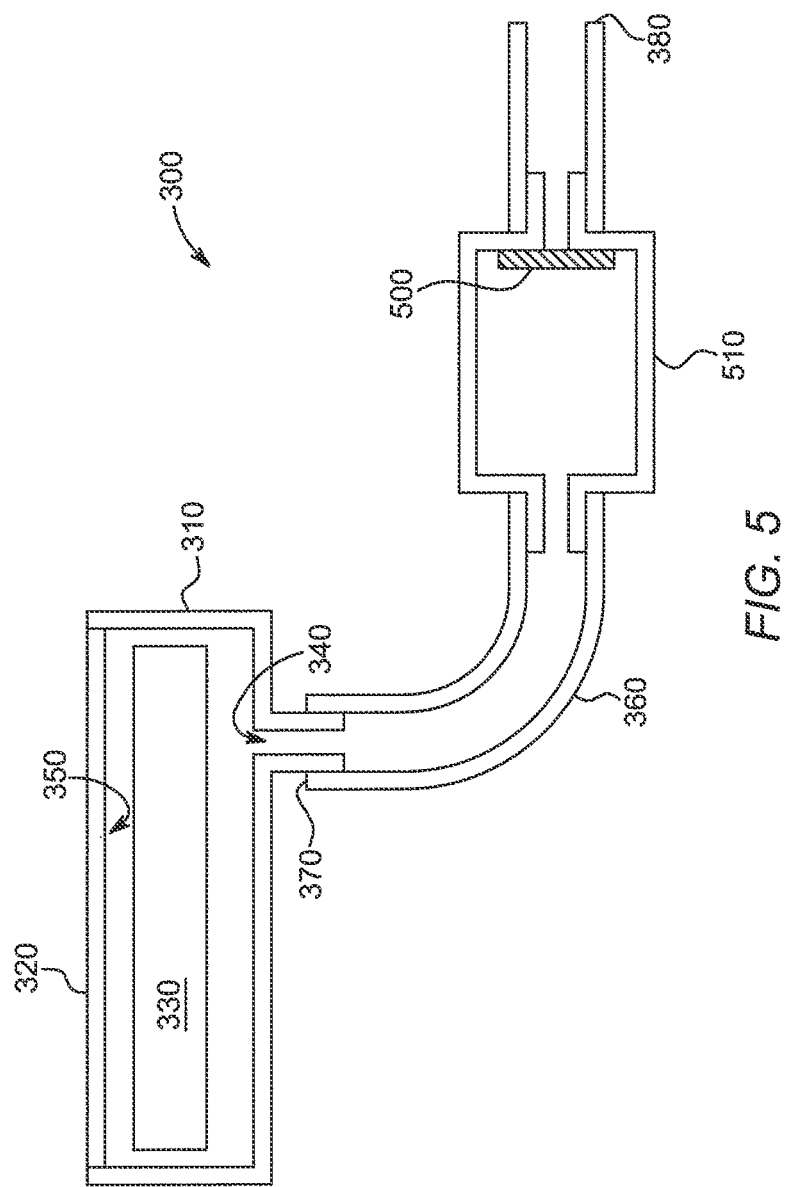
FIG. 5 is cross-sectional view of the example instrument cluster shown in FIG. 3, illustrating a further possible position of the membrane.

FIGS. 4 and 5 illustrate alternate locations for a membrane such as membrane 390. FIG. 4 illustrates example instrument cluster 300 having a membrane 400 installed covering vent 340. FIG. 5 illustrates example instrument cluster 300 having a membrane 500 installed within tube 360. Membrane 500 is shown installed using a suitable inline fitting 510, although it is noted that other types of fittings may be used. Membranes 400 and 500 may be substantially similar to membrane 390 described above.

Figure 6:
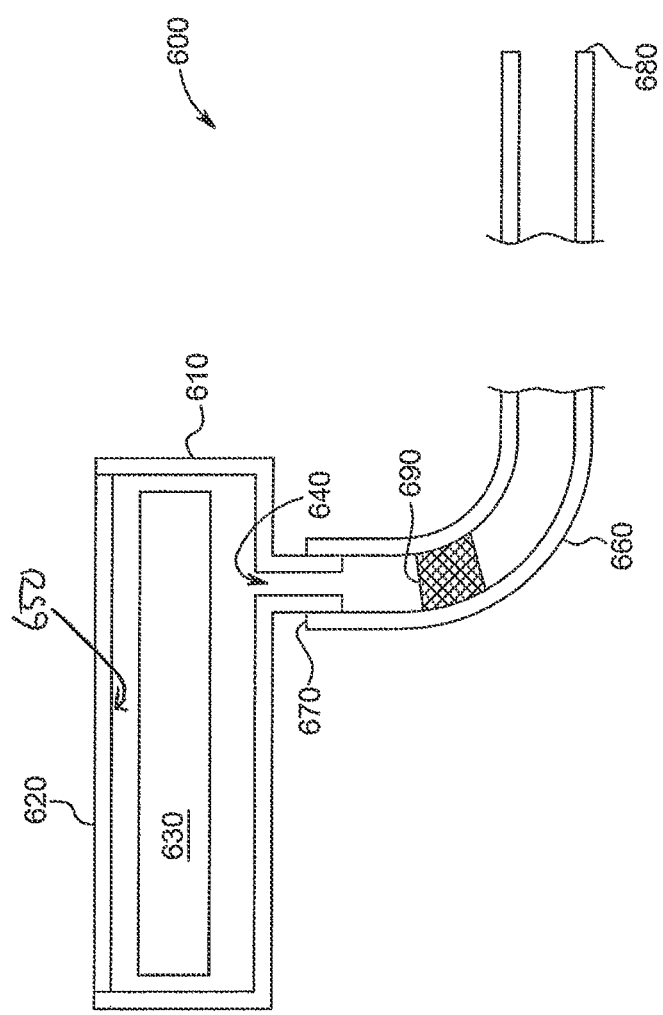
FIG. 6 is cross-sectional view of an example instrument cluster similar to the instrument cluster shown in FIG. 1 which includes a vent plug.

FIG. 6 illustrates an example instrument cluster 600, similar to instrument cluster 100 as shown and described with respect to FIG. 1, which further includes a vent plug 690.

Cluster 600 includes a housing 610, lens 620, and internal components 630. Housing 610 includes a vent 640 which may permit a pressure difference between the inside and outside of housing 610 to equalize. Vent 640 is connected to a tube 660.

Housing 610 may be substantially air tight, except for vent 640, which is connected to tube 660. Vent 640 may comprise or be attached to a fitting as shown to facilitate the connection to tube 660. The connection between vent 640 and tube 660 may also be substantially air tight. Tube 660 has a proximal end 670 and a distal end 680.

Vent plug 690 is installed in tube 660 in such a way that gasses can only transit tube 660 from distal end 680 to proximal end 670 through vent plug 690. Vent plug 690 may be a micro-porous plug or other suitable structure which permits the passage of gasses while preventing or impeding the passage of liquids or solids.

It is noted that vent plug 690 may also be installed in proximal end 670 or in another location within tube 660 in a suitable way (not shown) such that gasses can only transit tube 660 from distal end 680 to proximal end 670 through vent plug 690. Vent plug 690 may also be installed covering vent 640 in a suitable way (not shown) such that gasses may only enter housing 610 through vent plug 690.

If pressure within housing 610 decreases, the pressure decrease may draw air or other gasses into housing 610 from distal end 680 through vent plug 690, tube 660, and vent 640 into housing 610.

Distal end 680 may be installed in a location having a different humidity from the location of housing 610. Thus, air or other gasses drawn into housing 610 through vent 640 will have a humidity substantially similar to the location of distal end 680. If distal end 680 is located in a relatively low humidity environment, this may have the advantage of permitting housing 610 to be located in a more humid environment while avoiding drawing the humidity local to housing 610 into housing 610.

Further, by arranging vent plug 690 such that liquids are prevented from entering housing 610, the humidity within housing 610 may be further controlled. Vent plug 690 may also reduce the humidity of air or other gasses entering housing 610 through vent plug 690.

An anti-fog treatment 650 may be applied to the inside surface of lens 620. It is noted that anti-fog treatment 650 may be omitted in some implementations. As discussed herein, the anti-fog treatment may include surfactants or hydrophilic surfaces or substances for example. Moisture condensing on the inside surface of lens 620 may be spread out or absorbed by the anti-fog treatment 650 such that it is less visible and does not obscure visibility through the lens. However if the temperature of the lens 620 drops below the freezing temperature of the moisture, some of the condensation absorbed or spread by the anti-fog treatment 650 may freeze and create frost that obstructs visibility through the lens.

The formation of frost on the inside surface of lens 620 may be reduced however by maintaining a low moisture environment within housing 610, such as by locating distal end 680 and installing vent plug 690 as discussed above. This arrangement may also improve the service life of internal components 630 by reducing their exposure to moisture and pressure changes.

Figure 7:
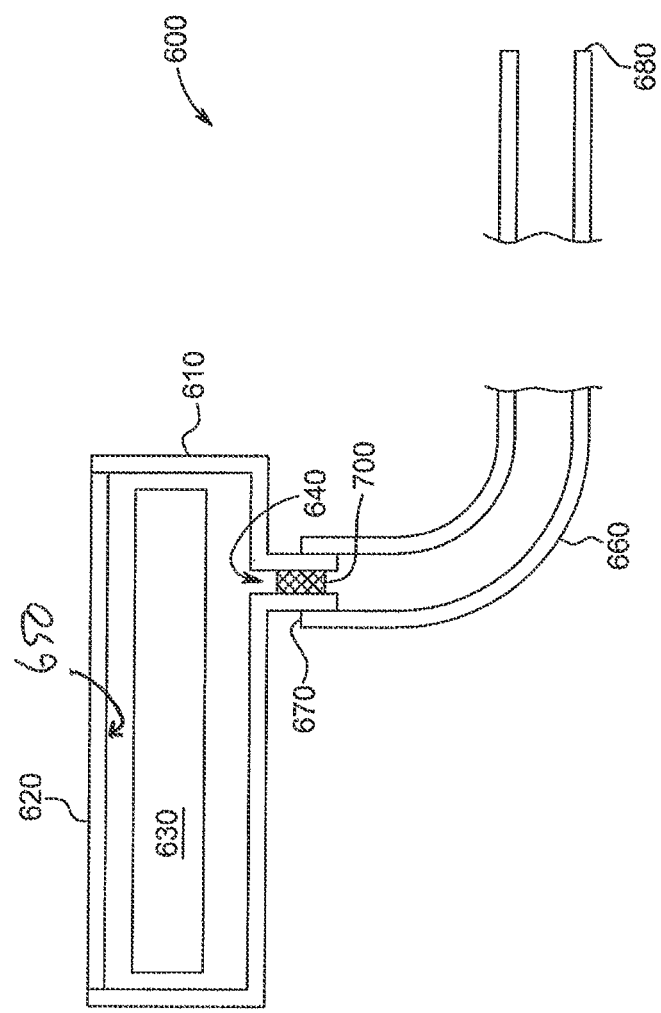
FIG. 7 is cross-sectional view of the example instrument cluster shown in FIG. 6, illustrating another possible position of the vent plug; and, FIG. 8 is cross-sectional view of the example instrument cluster shown in FIG. 6, illustrating a further possible position of the vent plug.
Figure 8:
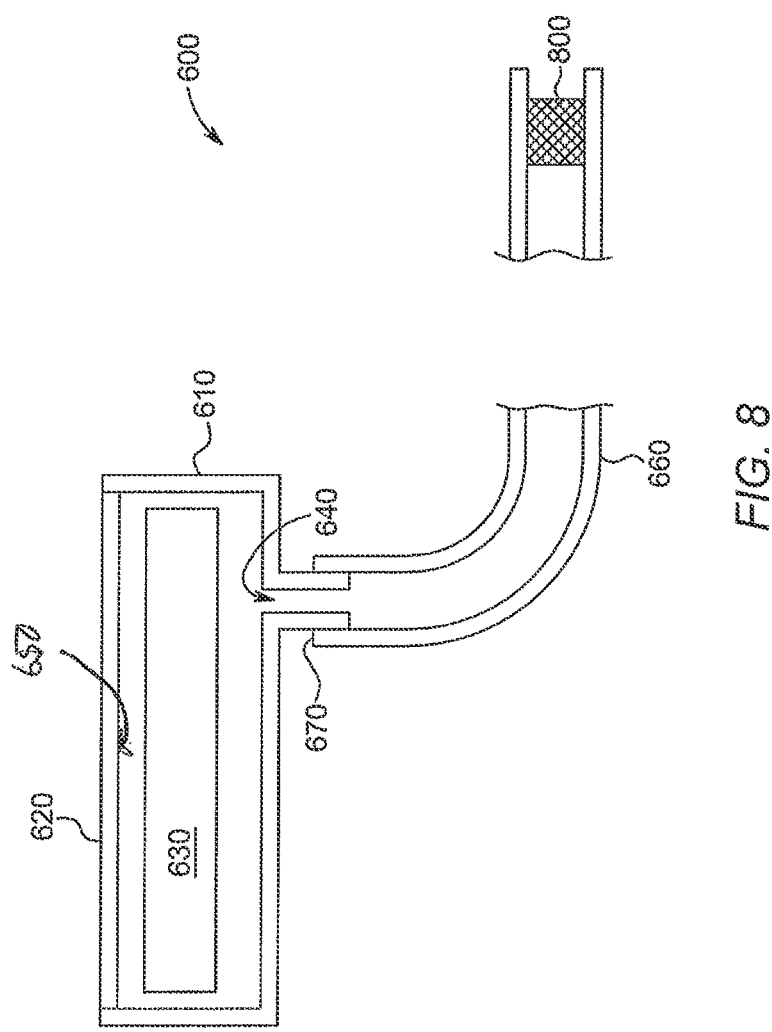

FIGS. 7 and 8 illustrate alternate locations for a vent plug such as plug 690. FIG. 7 illustrates example instrument cluster 600 having a vent plug 700 installed within vent 640. FIG. 8 illustrates example instrument cluster 600 having a vent plug 800 installed within tube 460 toward distal end 480. Vent plugs 700 and 800 may be substantially similar to vent plug 690 described above.

It is noted that condensation, fogging, and frosting may also occur in other types of instruments, such as telescopes and other optics, or other objects and devices having a lens and a housing. Although a vehicle instrument cluster is used herein to describe various techniques, it is noted that the various techniques discussed herein may be applied to any of these types of instruments and optics, or to other objects having a lens and a housing.

Although features and elements are described above in particular combinations, one of ordinary skill in the art will appreciate that each feature or element can be used alone or in any combination with the other features and elements.

What is claimed is:

1. A vehicle instrument configured to reduce lens fogging or frosting, the instrument comprising:
    a housing which comprises a vent and is disposed in a proximal end of the vehicle;
    a lens having a surface exposed to an interior space within the housing; and,
    a tube comprising a proximal end and a distal end, wherein the proximal end is operatively connected to the vent;
    wherein the instrument is sealed such that gasses may only enter the housing through the vent;
    wherein the housing is disposed in an instrument cluster of the vehicle;
    wherein the distal end of the tube is disposed in a distal end of the vehicle opposite the proximal end of the vehicle away from the housing and vehicle motor that contains a lower humidity such that the gasses drawn into the housing have a lower amount of moisture; and wherein the tube extends along the length of the vehicle and is continuous from the proximal end to the distal end of the vehicle.

2. The instrument of claim 1, wherein the instrument is sealed such that gasses may only enter the housing from the tube.

3. The instrument of claim 1, further comprising a membrane disposed such that gasses may only enter the housing from outside of the housing and tube through the membrane.

4. The instrument of claim 3, wherein the membrane impedes liquids and solids from entering the housing from outside of the housing and tube.

5. The instrument of claim 4, wherein the membrane comprises a micro-porous membrane.

6. The instrument of claim 1, further comprising a vent plug disposed such that gasses may only enter the housing from outside of the housing and tube through the vent plug.

7. The instrument of claim 6, wherein the vent plug impedes liquids and solids from entering the housing from outside of the housing and tube.

8. The instrument of claim 6, wherein the vent plug comprises a micro-porous material.

9. An instrument having a lens, the instrument comprising:
   a housing; and,
   a tube comprising a proximal end and a distal end, wherein the proximal end is operatively connected to the housing;
   wherein the instrument is sealed such that on a condition that a decrease in pressure occurs within the housing, the decrease in pressure draws gasses into the housing from the tube;
   wherein the housing is disposed in an instrument cluster in a proximal end of a vehicle;
   wherein the distal end of the tube is disposed in a second distal end of the vehicle opposite the proximal end of the vehicle away from the housing and vehicle motor that contains a lower humidity such that the gasses drawn into the housing have a lower amount of moisture; and
   wherein the tube extends along the length of the vehicle and is continuous from the proximal end to the distal end along the length of the vehicle.

10. The instrument of claim 9, wherein the instrument is sealed such that gasses may only enter the housing through the tube.

11. A method for reducing fogging or frosting of an instrument lens, the method comprising:
   providing an instrument housing which comprises a vent, an interior space, and an interior surface;
   providing a lens disposed such that the interior surface comprises a surface of the lens; and,
   operatively connecting a proximal end of a tube to the vent;
   wherein the instrument housing is disposed in an instrument cluster in a proximal end of a vehicle;
   wherein a distal end of the tube is disposed in a distal end of the vehicle opposite the proximal end of the vehicle away from the housing and vehicle motor that contains a lower humidity such that the gasses drawn into the housing have a lower amount of moisture; and
   wherein the tube extends along the length of the vehicle and is continuous from the proximal end to the distal end of the vehicle.

12. The method of claim 11, wherein the instrument is sealed such that gasses may only enter the housing through the vent.

13. The method of claim 11, wherein the instrument is sealed such that gasses may only enter the housing from the tube.

14. The method of claim 11, wherein the instrument is sealed such that gasses from outside the instrument may only enter the housing through the distal end of the tube.

15. The method of claim 11, further comprising positioning the housing in a first distal end; and, positioning the distal end of the tube in a second distal end; wherein a humidity difference exists between the first distal end and the second distal end.

16. The method of claim 11, further comprising positioning the housing in a first distal end; and, positioning the distal end of the tube in a second distal end; wherein a temperature difference exists between the first distal end and the second distal end.

17. The method of claim 11, further comprising treating the lens with an anti-fog treatment.

* * * * *